United States Patent
Yamazaki

[11] Patent Number: 6,106,924
[45] Date of Patent: Aug. 22, 2000

[54] LAMINATE MATERIAL AND UNIAXIALLY ORIENTED LAMINATE

[75] Inventor: Shinji Yamazaki, Yachiyo, Japan

[73] Assignee: Nippon Petrochemicals Company, Limited, Tokyo, Japan

[21] Appl. No.: 09/015,828

[22] Filed: Jan. 29, 1998

[30] Foreign Application Priority Data

Jan. 30, 1997 [JP] Japan ................................. 9-032898

[51] Int. Cl.$^7$ ...................................................... B32B 3/24
[52] U.S. Cl. ........................... 428/136; 428/105; 428/349; 428/336; 428/515; 428/516; 428/910; 442/51
[58] Field of Search .................................... 428/304.4, 515, 428/516, 34.9, 349, 336, 910, 105, 110, 131, 132, 136; 442/51

[56] References Cited

U.S. PATENT DOCUMENTS

| | | | |
|---|---|---|---|
| 5,032,442 | 7/1991 | Yamazaki et al. | 428/105 |
| 5,091,236 | 2/1992 | Keller et al. | 428/213 |
| 5,441,807 | 8/1995 | Brandt et al. | 428/349 |
| 5,861,202 | 1/1999 | Kimura et al. | 428/105 |

*Primary Examiner*—Paul Thibodeau
*Assistant Examiner*—D. Lawrence Tarazano
*Attorney, Agent, or Firm*—Scully, Scott, Murphy & Presser

[57] ABSTRACT

A laminate material and a uniaxially oriented laminate which contains an additive but does not suffer from the trouble caused by the exudation of said additive, and the laminate material comprises an inner layer composed of an orientable resin A containing an additive and coating layers composed of a resin B and being applied onto both surfaces of said inner layer to prevent the additive from exudation and the uniaxially oriented laminate is prepared by uniaxially stretching the above laminate material.

11 Claims, 3 Drawing Sheets

LAMINATE MATERIAL AND UNIAXIALLY ORIENTED LAMINATE

BACKGROUND OF THE INVENTION

1) Field of the Invention

This invention relates to a laminate material containing an additive, especially, a weather proofing agent and to a uniaxially oriented laminate which is prepared by stretching the above laminate material in one direction.

2) Prior Art

An anti-oxidizing agent is generally added to oxidizable plastics material in order to avoid the deterioration of the plastics material during its forming process and uses as several products. In addition, anti-weathering property is imparted by adding a UV absorbing agent (light stabilizer) to thin sheet-like materials such as films, woven fabrics and nonwoven fabrics which are exposed to ultraviolet rays for a long time in outdoor uses. The light stabilizer is added by several means as follows:

(1) A light stabilizer is directly kneaded into a resin material.

(2) A light stabilizer itself or a coating material containing a light stabilizer is applied to resin films.

(3) A resin film is laminated with a film containing a light stabilizer.

(4) In co-extrusion process, a resin containing a light stabilizer is supplied to the outer side of a resin material.

(5) Final products are coated with a light stabilizer.

It is generally accepted that a content of 300 ppm or more of light stabilizer is necessary for attaining the requirement of several articles having weather-proofing property. However, the resin material containing a light stabilizer having no covering layer is directly brought into direct contact with several parts of forming machines, so that the light stabilizer is liable to be accumulated on rolls, cutter blades and other parts, which causes undesirable results in stretching, pressing, slitting and splitting operation and invites dirt and alien substances to cause various troubles.

BRIEF SUMMARY OF THE INVENTION

The object of the present invention is to eliminate the above-described problems and to provide an improved laminate material and uniaxially oriented laminate which contain an additive agent, especially a light stabilizer, but which are free from the trouble caused by the exuding of the additive agent in the subsequent forming process.

As a result of extensive investigation carried out by the present inventors in view of the above-described object, the present invention has been made by finding out that, both the side faces of a resin layer containing an additive agent is applied with another resin layer to avoid the troubles caused by the exuding of the additive agent, thereby providing a laminate material of quite excellent properties.

It is, therefore, a first aspect of the present invention to provide a laminate material which comprises an inner layer composed of an orientable resin A containing an additive and coating layers composed of a resin B which layers are applied onto both surfaces of the inner layer to prevent the additive from exudation.

The above additive is at least one member selected from the group consisting of weather-proofing agents, coloring agents, pigments and fillers. For example, 300 to 10,000 ppm of a light stabilizer can be used as the weather-proofing agent.

Furthermore, the resin B is a thermoplastic resin substantially containing no additive and having a melting point lower than that of the orientable resin A.

Still further, the laminate material has a triple-layer structure made by co-extrusion and composed of a layer of orientable resin A containing an additive or additives and layers of resin B containing no additive being applied onto both surfaces of the inner layer. In another type of embodiment, the laminate material also has a triple-layer structure which is made by preparing two films each composed of a layer of orientable resin A containing an additive or additives and a layer of resin B containing no additive and then rolling the films with the layers of resin A in face-to-face relationship so as to make them an integral inner layer.

In a second aspect of the present invention, a uniaxially oriented laminate is provided, which laminate is prepared by uniaxially stretching a laminate material which is composed of an inner layer of orientable resin A containing an additive or additives and layers of resin B applied onto both surfaces of the inner layer to prevent the additive from exudation from the inner layer. The thickness of the layers of resin B after orientation is 1 µm or above, and preferably more than 4 µm and more. The above uniaxially oriented laminate is used in the forms of a split web (a), a slit web (b) and uniaxially oriented tapes (c). The split web (a) is made by the steps of stretching the laminate material and then forming therein a plurality of intermittent splits in the direction of the stretching. For example, it is made by the steps of film formation, longitudinal stretching with a total stretching ratio in the range of 5 to 15, and longitudinal splitting in a cross-stitch pattern.

The slit web (b) is made by the steps of forming a plurality of intermittent slits in a laminate material and stretching the laminate material in the direction of the slits. For example, it is made by the steps of film formation, preliminary longitudinal stretching with a stretching ratio in the range of 1.1 to 3, transverse slitting in a cross-stitch pattern, and transverse stretching which a stretching ratio in the range of 1.1 to 15.

The uniaxially oriented tapes (c) are made by the steps of film formation, longitudinal cutting into the form of tapes and, before and/or the cutting, stretching with a total stretching ratio in the range of 1.1 to 15.

BRIEF DESCRIPTION OF DRAWINGS

These and other aspects and features of the present invention will become more apparent by the following detailed description taken in connection with the accompanying drawings, in which.

DETAILED DESCRIPTION OF THE INVENTION

Figure 1:
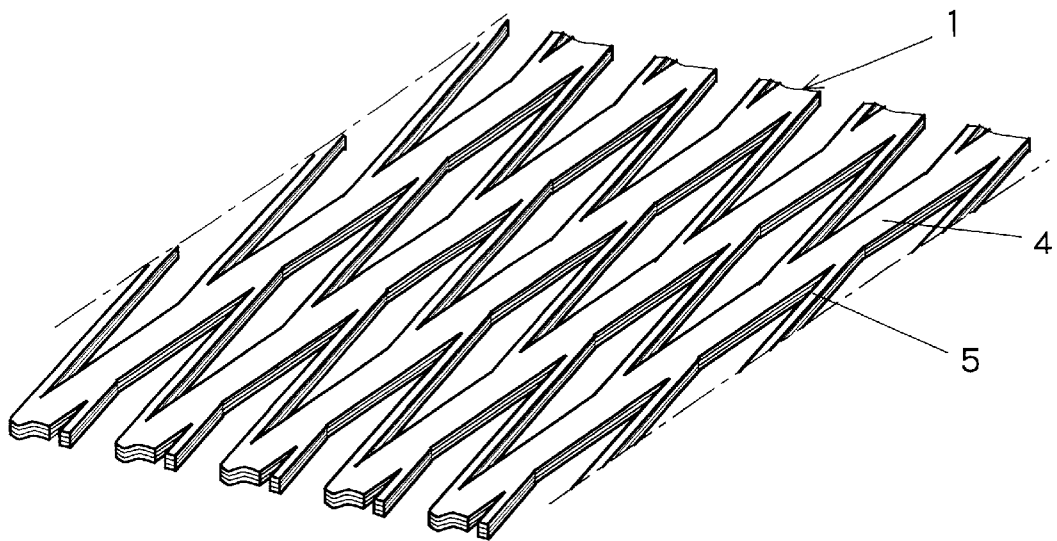
FIG. 1(a) is an enlarged perspective view of a part of a split web (a) according to the present invention and FIG. 1(b) is a further enlarged perspective view of a lower cut-off end portion of the split web (a)
Figure 1:
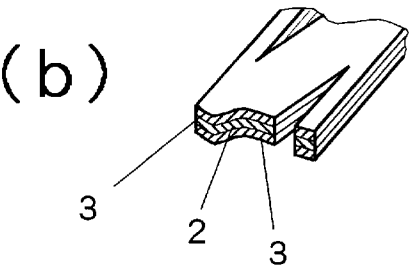

The present invention will be described in more detail.

As the orientable resin A used in the present invention, crystalline thermoplastic resin is generally preferable.

More particularly, exemplified as the resin A are those of 0.91 to 0.97 g/cm$^3$ in density such as α-olefin homopolymers of low density polyethylene, medium density polyethylene and high density polyethylene, polypropylene, polybutene-1 and poly-4-methylpentene-1; copolymers of these α-olefins of these monomers and hexene-1, polyamides, polyesters, polycarbonate, polyvinyl alcohol, polyvinylidene chloride and saponified product of ethylene-vinyl acetate copolymer.

The resin B used in the present invention is preferably the resin having a lower melting point by at least 5° C. than that of the orientable resin A. Especially, a resin having a lower melting point by 10 to 50° C. or more is preferable.

These are exemplified by low density polyethylene, ethylene-α-olefin copolymers having densities of about 0.86 to 0.94 g/cm$^3$, ethylene-vinyl acetate copolymers, ethylene-acrylic acid copolymers, ethylene-acrylic ester copolymers, ethylene-methacrylic acid copolymers, ethylene-methacrylic ester copolymers, ethylene-maleic acid copolymers, ethylene-maleic ester copolymers, thier mixtures and the products modified with unsaturated carboxylic acid.

The combination of the orientable resin A and the resin B is done as follows. When an α-olefin homopolymer of medium density polyethylene, high density polyethylene, polybutene-1 or poly-4-methylpentene-1; or a copolymer of these α-olefins of these monomers and hexene-1 is used as the orientable resin A, low density polyethylene, ethylene-α-olefin copolymer having a density of about 0.86 to 0.94 g/cm$^3$, ethylene-vinyl acetate copolymer, ethylene-acrylic acid copolymer, ethylene-acrylic ester copolymer, ethylene-methacrylic acid copolymer or ethylene-methacrylic ester copolymer is used as the resin B. When polypropylene, polyamide, polyester, polycarbonate, polyvinyl alcohol, or a saponified product of ethylene-vinyl acetate copolymer is used, the polyolefin modified with unsaturated carboxylic acid or ethylene-vinyl acetate copolymer is used together.

The additives to be added to the orientable resin A in the present invention are exemplified by weather-proofing agents, coloring agents, pigments, fillers and so forth. Especially in the cases of thin sheets and their products of woven fabrics and nonwoven fabrics, it is desirable to add a light stabilizer in order to improve the weather-proof property.

In the present invention, the light stabilizers are exemplified by UV light absorbing agents and light stabilizing agents such as benzotriazole, benzophenone derivatives, substituted acrylonitrile, salicylic acid compounds, nickel complexes and hindered amines.

(1) The benzotriazole UV light absorbing agents are exemplified by 2-(2'-hydroxy-5'-methylphenyl) benzotriazole, 2-(2'-hydroxy-5'-tert-butylphenyl) benzotriazole and alkylated hydroxybenzotriazole.

(2) The benzophenone UV light absorbing agents are exemplified by 2-hydroxy-4-methoxybenzophenone, 2,4-dihydroxybenzophenone, 2-hydroxy-4-octoxybenzophenone and 2-hydroxy-4-dodecyloxybenzophenone.

(3) The acrylonitrile UV light absorbing agents are exemplified by 2-ethylhexyl-2-cyano-3,3'-diphenyl acrylate and ethyl-2-cyano-3,3'-diphenyl acrylate.

(4) The salicylic acid UV light absorbing agents are exemplified by phenyl salicylate, p-tert-butylphenyl salicylate and p-octylphenyl salicylate.

(5) The nickel complex UV light stabilizing agents are exemplified by nickel bis(octylphenyl)sulfide and [2,2'-thio-bis(4-tert-octylphenolate)]-n-butylamine nickel.

(6) The hindered amine UV light stabilizing agents are exemplified by bis(2,2,6,6-tetramethyl-4-piperidyl)-sebacate.

Among these light stabilizers, the hindered amine UV light absorbing agents are most desirable.

The use quantity of the light stabilizer depends upon the purposes and conditions of uses of the laminate materials, uniaxially oriented laminates or their products of woven fabrics or nonwoven fabrics. It is necessary to use an effective quantity and generally, 300 ppm or more is added to the inner layer of orientable resin A. This addition quantity is preferably in the range of 300 to 10,000 ppm. If the addition quantity is less than 300 ppm, it is not desirable because its effective life is too short or the effect itself is too low. On the other hand, if the addition quantity exceeds 10,000 ppm, it is not desirable either because the cost is raised although the effective life is long enough.

It is desirable that the coating layer of resin B does not contain the light stabilizer. However, in the case that the exuding of the additive agent is allowed or the degree of exudation is very low without causing any problem in a subsequent forming process of laminates, the additive agent may be added to the resin B.

There are organic pigments and inorganic pigments as the coloring agents. The organic pigments are exemplified by the types of azo, anthraquinone, phthalocyanine, quinacridone, isoindolinone, dioxane, perylene, quinophthalone and perinone. More particularly, those defined in Official Book on Food Additives such as yellow food color No. 4 (tartrazine), yellow food color No. 5 (Sunset Yellow FCF), green food color No. 3 (Fast Green FCF), copper chlorophyll and sodium iron chlorophylline can be used. In addition, the pigments which can be used for coloring synthetic resins such as Phthalocyanine Blue, Phthalocyanine Green, Fast Yellow and Diazo Yellow can be used properly.

The inorganic pigments are exemplified by white pigments such as titanium dioxide, white lead, zinc oxide, lithophone, baryta, precipitated barium sulfate, calcium carbonate, gypsum and precipitated silica, and other pigments such as cadmium sulfide, cadmium selenide, ultramarine blue, iron oxide, chromium oxide and carbon black.

In the present invention, the coating layer of the resin B is applied to both the surfaces of the inner layer of orientable resin A containing an additive or additives. This can be done through various kinds of ordinary methods. For example, the film of resin A is applied with the resin B by a coating method, the film of resin A is laminated with the films of resin B, or co-extrusion is carried out with one layer of the resin A and two layers of resin B to prepare a triple-layer film. Although any method of them can be employed, however, the co-extrusion is preferable because neither coating operation nor lamination of films is required and apparatus and working of preparation are simplified and the number of production step is reduced. In addition, a laminate having a high inter-layer strength can be obtained. That is, the component film layers of a multi-layer film that is prepared by the co-extrusion, are hardly peeled off in the succeeding steps of rolling or stretching, subsequent slitting or splitting after the stretching, weaving with stretched multi-layer tapes or cross-wise laminating operation forming a reticular non-woven fabric.

The methods for preparing triple-layer films through co-extrusion are roughly divided into two groups.
(1) The method of triple-layer co-extrusion of a layer structure of B—A—B.
(2) The method in which double-layer co-extrusion of B—A is done and a pair of its products are laminated to form a layer structure of B—A/A—B.

The above method (1) is commonly employed because the film having a desired layer structure can be obtained by only one film forming process. However, an extrusion die of complicated structure is expensive and highly skilled labor is required for regulating the thickness of each layers.

On the other hand, in the method (2), the structure of extrusion die is simple and inexpensive as compared with those in the method (1) and the adjusting of layer thickness is also far easy. However, the laminating process is necessary after the film formation, so that the process is troublesome and cannot be accepted commonly. Meanwhile, if the film formation is done by inflation method (blown film extrusion), a laminate film having a layer structure of B—A/A—B can be automatically formed by flattening a tubular bubble of double layer film. Furthermore, when it is used for the material for preparing slit webs, the laminating step after the film formation can be omitted because the film formation is followed by rolling step and slitting step with numerous thermal cutting blades, in which thermal cutting and welding are done firmly. Accordingly, the method (2) is suitable for such a case.

The laminate material of the present invention is then uniaxially stretched to form a uniaxially oriented laminate. The uniaxially oriented laminate is exemplified by a uniaxially oriented multi-layer film, split web, slit web and uniaxially oriented multi-layer tape.

The above uniaxially oriented film is made by uniaxially stretching the above-mentioned laminate film material. The split web is prepared by longitudinally stretching the above laminate film material and numerous splits like dashed lines are formed in the direction of the stretching. The slit web is prepared by forming numerous transverse cuts like dashed lines in the above laminate material and it is then stretched in the direction of the cuts. The above uniaxially oriented multi-layer tapes are prepared by cutting the laminate material transversely or longitudinally into numerous long tapes which are stretched before and/or after the cutting.

In the preparation of woven fabric and non-woven fabric, the problem of the exuding of additive is not caused to occur by employing the above split web, slit web or uniaxially oriented multi-layer tape.

The above-mentioned non-woven fabric is exemplified by a nonwoven fabric which is prepared by cross-wise laminating and thermally bonding the split webs, a nonwoven fabric which is prepared by cross-wise laminating and thermally bonding the slit webs, a nonwoven fabric which is prepared by cross-wise laminating and thermally bonding the split web and the slit web, a nonwoven fabric which is prepared by cross-wise laminating and thermally bonding a pair of the uniaxially oriented multi-layer tapes, and a nonwoven fabric which is prepared by so laminating a split web or a slit web with uniaxially oriented multi-layer tapes that the orientation axes of them are crossed. The above-mentioned woven fabric is prepared for example by weaving the uniaxially oriented multi-layer tapes.

The non-woven fabric composed of the uniaxially oriented laminate materials are preferably those made by cross-wise laminating at least one kind of material selected from split web, slit web and uniaxially oriented multi-layer tape. However, in some uses, the lamination is carried out with the orientations of the materials in the same or random directions. Furthermore, it is possible to combine these woven fabric and non-woven fabric.

The present invention will be described in more detail with reference to the accompanying drawings.

In the first place, an example of a split web (a) of uniaxially oriented laminate material is shown. An orientable resin A containing a light stabilizer and a resin B containing no light stabilizer and having a melting point lower than that of the resin A are subjected to multi-layer inflation process with a triple-layer die to form a tubular triple-layer film and it is cut open into a sheet of triple-layer film. A high density polyethylene or polypropylene is used for the inner layer of orientable resin A and low density polyethylene or a polypropylene based copolymer of low melting point is used for both the outer coating layers of resin B. The low density polyethylene or the polypropylene based copolymer is compatible with the orientable resin A. It is also possible to employ an extrusion method such as multi-layer T die method to prepare the triple-layer film.

The thus prepared multi-layer film is then subjected to rolling and/or stretching in the longitudinal direction to carry out primary stretching with the stretching ratio in the range of 1.1 to 10, preferably 4 to 8. Secondary stretching is then carried out to attain the overall stretching ratio in the range of 5 to 15, preferably 6 to 10. The obtained stretched film is split in the cross-stitch pattern using a splitting machine. The above-mentioned multi-layer film material is formed into a reticular split web through this process and, if necessary, the width of the web is enlarged to expand the meshes of net and then thermally fixed.

FIGS. 1(a) and 1(b) are enlarged partial perspective views of a split web. The split web 1 is made by laminating coating layers 3 of resin B containing no light stabilizer onto both surfaces of an inner layer 2 of an orientable resin A containing more than 300 ppm of light stabilizer and it is then subjected to longitudinal stretching and split longitudinally with a splitter. In the drawing, the numeral 4 denotes a trunk fiber and 5, a branch fiber.

An example of preparation method of a slit web (b) of the uniaxially oriented laminate material of the present invention will be described.

In the first place, by using an orientable resin A and a low melting point resin B (coating layer resin) like the above ones, a tubular double layer film with an outer layer of the resin B is prepared by multi-layer inflation method and it is folded flat to form a film having a layer structure of [coating resin-orientable resin/orientable resin-coating resin]. It is then rolled weakly in the longitudinal direction so as to stick the pair of sheets together. Although the ratio of elongation depends upon the kind of used resin material, it is preferably in the range of about 1.1 to 3 because, if the ratio is too large, the stretching in the subsequent step becomes difficult. The thus obtained multi-layer film is then subjected to slitting process to form numerous slits of transverse cross-stitch pattern using thermally cutting blades. It is further subjected to transverse stretching at a stretching ratio of 1.1 to 15, preferably 5 to 10 to form a reticular slit web. If necessary, the stretching can be divided into two stage operation. In the like manner as in the former split web, the width of the slit web is enlarged transversely or in an oblique direction and it is then fixed.

FIGS. 2(a) and 2(b) are enlarged partial perspective views of a slit web. The slit web 6 is made by laminating coating layers 3 of resin B containing no light stabilizer onto both surfaces of an inner layer 2 of orientable resin A containing more than 300 ppm of light stabilizer and it is then subjected to longitudinal weak stretching and transverse slitting in a cross-stitch pattern with thermal blades. It is further stretched transversely and widened to some extent.

The uniaxially oriented multi-layer tapes (c) of the present invention are prepared such that, before and/or after the cutting operation, a multi-layer film formed in the above method is uniaxially stretched at a stretching ratio of 1.1 to 15, preferably 3 to 10 in the longitudinal or transverse direction.

Figure 3:
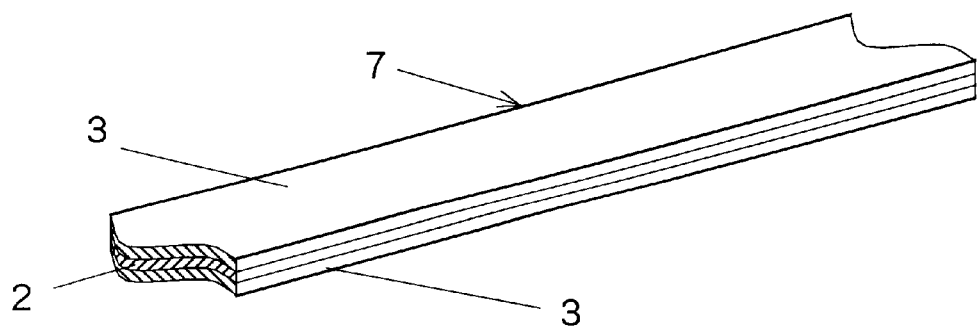
FIG. 3 is an enlarged perspective view of a part of a uniaxially oriented multi-layer tape (c)

FIG. 3 is an enlarged perspective view of a part of a uniaxially oriented multi-layer tape. The uniaxially oriented multi-layer tape 7 is prepared by laminating coating layers 3 of a resin B containing no light stabilizer onto both the surfaces of an inner layer 2 of an orientable resin A containing more than 300 ppm of light stabilizer and it is then subjected to stretching and cutting.

In the case that a woven fabric or a non-woven fabric is prepared by further laminating the uniaxially oriented laminate materials, as described above, a resin having a melting point lower than that of the orientable resin A is used for the inner layers as the resin B to form the coating layers. The lamination of films is done by thermal pressing utilizing the coating layers as adhesive layers.

In this process, the layer structure of final product is B—A—B/B—A—B, so that, even though the resin B contains no light stabilizer, because ultra-violet rays are absorbed by the inner layer of the orientable resin A before the rays reach the adhesive layers, the adhesive layers are prevented from deterioration.

The thickness of the coating layer after stretching of the resin B containing no light stabilizer is not especially limited so long as the exudation of light stabilizer from the inner layer of the orientable resin A can be avoided. In view of the effect as the coating layer and adhesive layer, the thickness is preferably 1 $\mu$m or more, and more than 4 $\mu$m is more desirable in view of the preparation process and the performance of products.

When a non-woven fabric is produced, for example, the mesh openings of the above-described split web (a) and slit web (b) are enlarged to a desired degree and they are so laminated that their orientation axes are intersected and thermally stuck together. Through this procedure, it is possible to produce a reticular non-woven fabric which is excellent in strength, size stability and breathability. As described above, the fibers of the split web are aligned in the longitudinal direction. When a pair of these webs are crosswise laminated, one of the webs is passed longitudinally and the other web is cut in the length of the width of a product and it is put in layers together sideways, and then the thermal bonding is carried out. When both a split web and a slit web are crosswise laminated, both the webs are passed together in the machine direction.

When the above-described uniaxially oriented multi-layer tapes (c) are used, they are appropriately arranged and laminated together, which is followed by thermal bonding to obtain a non-woven fabric. It is also possible to form a woven fabric using a loom.

Figure 2:
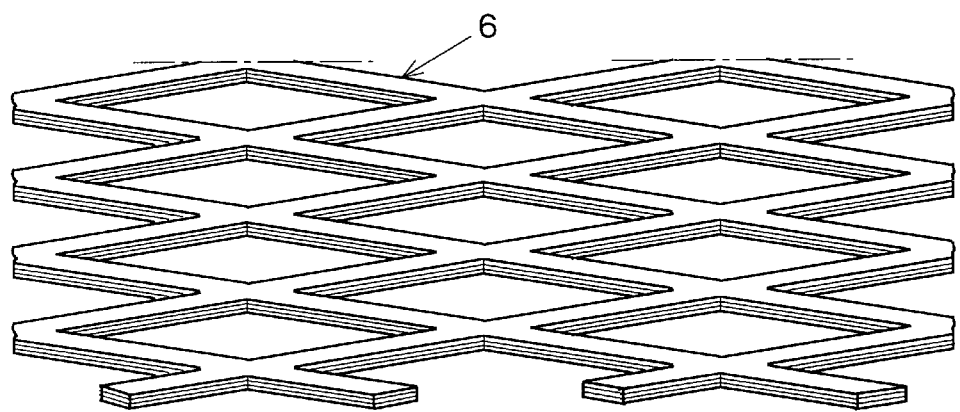
FIG. 2(a) is an enlarged perspective view of a part of a slit web (b) and FIG. 2(b) is a further enlarged perspective view of a lower cut-off end portion of the slit web (b)
Figure 2:
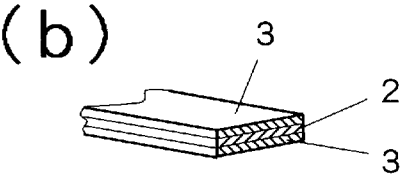
Figure 4:
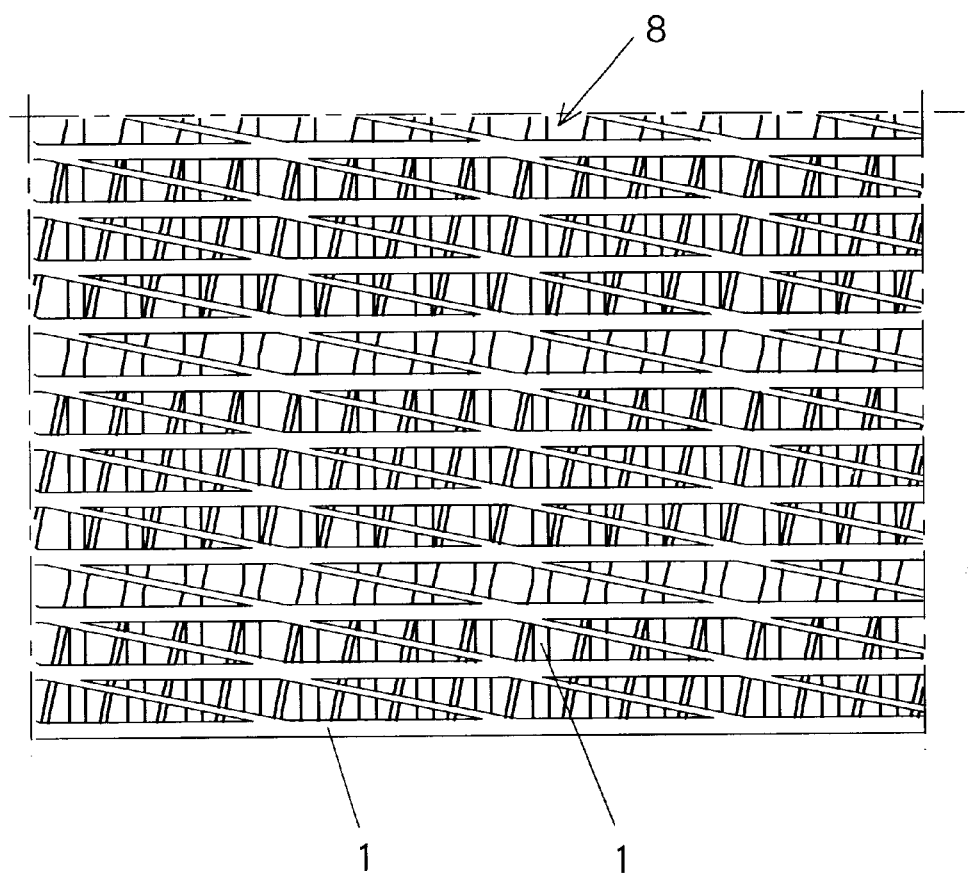
FIG. 4 is an enlarged partial plan view of an embodiment of a nonwoven fabric.
Figure 5:
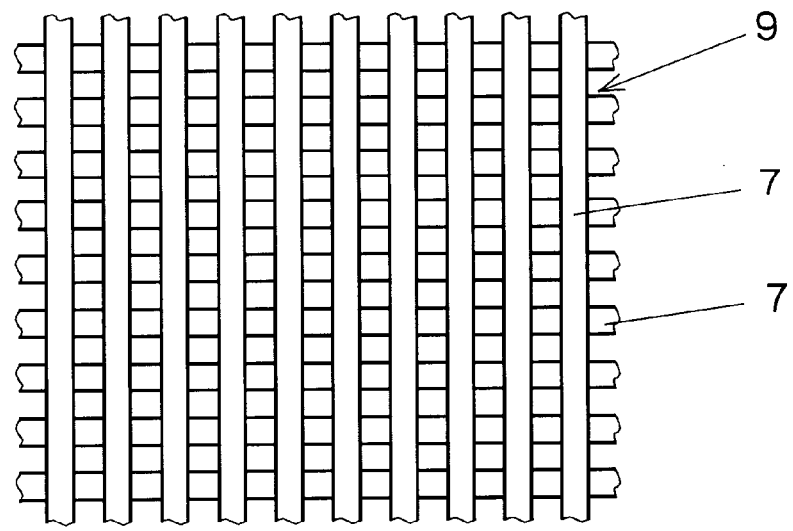
FIG. 5 is an enlarged partial plan view of another embodiment of a nonwoven fabric.
Figure 6:
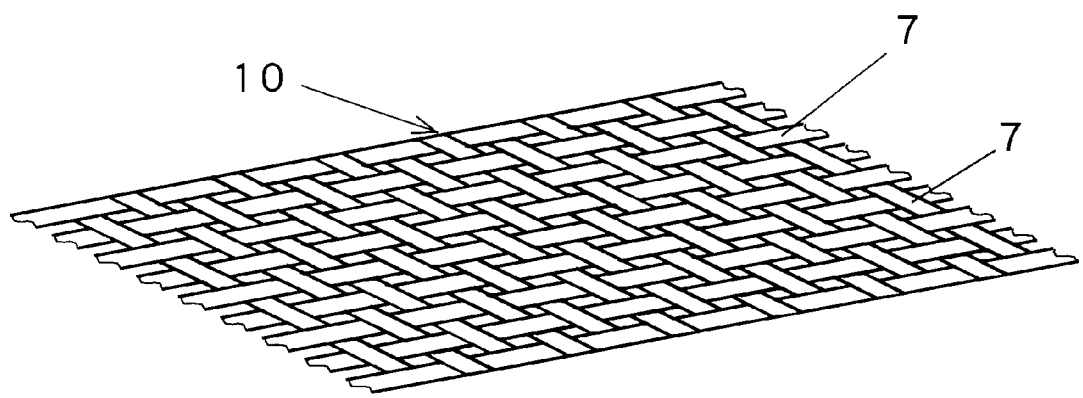
FIG. 6 is an enlarged partial perspective view of an embodiment of a woven fabric.

Particular combinations of the uniaxially oriented laminate materials are illustrated:

(1) A non-woven fabric 8 in FIG. 4 made by crosswise laminating two sheets of split webs 1 in FIG. 1, (2) a non-woven fabric made by crosswise laminating a split web 1 in FIG. 1 and a slit web 6 in FIG. 2, (3) a non-woven fabric made by crosswise laminating two sheets of slit webs 6 in FIG. 2, (4) a non-woven fabric 9 in FIG. 5 made by crosswise laminating two groups of uniaxially oriented multi-layer tapes 7 in FIG. 3, and (5) a woven fabric 10 in FIG. 6 made by weaving the uniaxially oriented multi-layer tapes 7 in FIG. 3.

The reticular non-woven fabric of the above items (1) and (2) made by crosswise laminating the split web and slit web are exemplified "NISSEKI CLAF" (trademark, made by Nisseki Plastics Co., Ltd.).

EXAMPLE

The present invention will be described in more detail with reference to several examples.

The various materials used in examples are as follows.
(1) Layer of Orientable Resin A
Orientable Resin A High density polyethylene (MFR: 1.0, density: 0.956 g/cm$^3$, trademark: JEYREX E 710, made by Japan Polyolefin Co., Ltd.)
Antioxidant 1500 ppm of 1:1 mixture of IRGANOX 1010 (pentaerythrityl-tetrakis[3-(3,5-di-tert-butyl-4-hydroxyphenyl)-propionate]):IRGAPHOS 168 (tris(2,4-di-tert-butylphenyl)-phosphite), made by Ciba-Geigy.
Light Stabilizer 1000 ppm of hindered amine type light stabilizer of the condensation product of 1,2,3,4-butane tetracarboxylic acid, 1,2,2,6,6-pentamethyl-4-pyperidinol and β,ββ',β'-tetramethyl-3,9-(2,4,8,10-tetraoxaspiro[5,5]undecane) diethanol, trademark: LA 63, made by Asahi Denka Kogyo K.K.
(2) Layer of Resin B
Low Melting Point Resin B Low density polyethylene (MFR: 3.0, density: 0.924 g/cm$^3$, trademark: JEYREX F30EE, made by Japan Polyolefin Co., Ltd.)
Antioxidant 900 ppm of 1:1 mixture of IRGANOX 1010 and IRGAPHOS 168 made by Ciba-Geigy.
Slip Agent 0.3% of 1:1 mixture of stearic acid and calcium stearate.

Example 1

Using high density polyethylene as an orientable resin A and low density polyethylene as layers of a resin B applied on both side surfaces of the layer of resin A (structure: B—A—B), a triple-layer film was prepared by multi-layer water-cooled inflation method. The obtained triple-layer film had a width of 1500 mm and thicknesses of the respective layers, 15 $\mu$m, 100 $\mu$m, 15 $\mu$m. The obtained film was passed through a hot water bath at 90 to 95° C. and was stretched longitudinally at an elongation rate of about 6. The film was then subjected to secondary stretching at a final elongation rate of 8 through hot air of 100° C. Numerous longitudinal slits were formed in this stretched film by splitting it with a rotary splitting machine as disclosed in Japanese Utility Model Publication No. 51-38979, thereby obtaining a split web having numerous slits in a cross-stitch pattern. The width of the web was expanded by 2.5 times to form a reticular split web and two sheets of the webs were laminated crosswise to obtain a reticular non-woven fabric. Through this process, any trouble caused by the exudation of the light stabilizer was not caused to occur in the processing apparatus. As shown in the following Table 1, the weather resistance of the obtained non-woven fabric was sufficient enough for outdoor uses.

As compared with Comparative Example 1 as described below, about 1.6 to 1.7 times amount of the light stabilizer was used in Example 1, however, Example 1 is far advantageous in view of the fact that not trouble in preparation process was caused to occur.

Example 2

Using high density polyethylene as an orientable resin A and low density polyethylene as layers of a resin B, a double-layer film was prepared by multi-layer water-cooled inflation method. The obtained double-layer film had a width of 360 mm and thicknesses of the respective layers of B—A were 35 μm and 115 μm. The obtained film was folded flat to form a layer structure of B—A/A—B and it was longitudinally stretched at about 100° C. at an elongation rate of about 2 to unify the folded film. Then, except both edge portions, numerous transverse cuts were formed in this film with thermal blades at above 200° C. in a cross-stitch pattern. The film was then transversely stretched at an elongation rate of about 8.3 to form a reticular slit web of 2300 mm in width having main fibers aligned in transverse direction. This slit web was crosswise laminated with the split web prepared in Example 1 and subjected to thermal bonding at about 120° C. to obtain a reticular non-woven fabric. The exudation of the light stabilizer was not caused to occur at all throughout the apparatus. The test results of weather resistance of this non-woven fabric are shown in Table 1.

Comparative Example 1

Preparation of laminate film was carried out in the like manner as in Example 1 using the same resins except that no light stabilizer was added to the resin A but 2000 ppm of the light stabilizer was added to the resin B. As a result, the troubles owing to the exudation of the light stabilizer were caused to occur throughout the process. For this reason, operation was often stopped to clean up the apparatus and long time operation was hardly carried out. However, the product itself was fitted to the outdoor uses as shown in Table 1.

Comparative Example 2

Preparation of laminate film was carried out in the like manner as in Example 1 using the same resins except that no light stabilizer was used. As a result, the product itself was not fitted to outdoor uses as shown in Table 1.

Comparative Example 3

Preparation of laminate film was carried out in the like manner as in Example 2 using the same resins as those used in Comparative Example 1. As a result, troubles owing to the exudation of the light stabilizer were often caused to occur. Especially, smooth operation was hardly done in the stretching process and continuous operation was impossible.

The products were tested with the following methods.
(1) Weather Resistance

Test was done using Sunshine Weather-ometer according to JIS B 7753/1977, in which the time length of spraying was 12 minutes per 60 minutes.
(2) Adhesive Strength The upper part to the middle part of a test piece (200 mm length×150 mm width) was hooked on a J-shaped device that is connected to the load cell of Tensilon and the bottom part of the test piece was fixed to Tensilon. The test piece was pulled at a pulling rate of 500 mm/min and a chart speed of 50 mm/min. The average of amplitudes of indicated loads (kg) when the meshes of the test piece got loose, was determined.
(3) Tensile Strength and Elongation A low speed tension type tester (Schopper's tensile tester) was used. The distance between the upper gripper and the lower gripper was set to 100 mm and both ends of a test piece (200 mm length×50 mm width) were fixed. The test piece was pulled at a rate of 200 mm/min. and load (kg/5 cm w.) and elongation (%) were determined when the test piece was broken down.

TABLE 1

| Exposure (hr) | 300 | 600 | 900 | 1200 | 1500 | 1800 |
|---|---|---|---|---|---|---|
| <Example 1> | | | | | | |
| Adhesive Strength (kg) | 110 | 110 | 108 | 106 | 89 | 64 |
| Tensile Strength (kg/5 cm w.) | 94 | 92 | 90 | 88 | 83 | 67 |
| Elongation (%) | 90 | 77 | 70 | 69 | 65 | 54 |
| <Example 2> | | | | | | |
| Adhesive Strength (kg) | 110 | 110 | 110 | 110 | 85 | 67 |
| Tensile strength (kg/5 cm w.) | 95 | 95 | 90 | 90 | 80 | 65 |
| Elongation (%) | 90 | 80 | 80 | 75 | 60 | 60 |
| <Comparative Example 1> | | | | | | |
| Adhesive Strength (kg) | 110 | 110 | 140 | 140 | 100 | 94 |
| Tensile Strength (kg/5 cm w.) | 95 | 90 | 93 | 88 | 85 | 70 |
| Elongation (%) | 95 | 84 | 80 | 72 | 66 | 60 |
| <Comparative Example 2> | | | | | | |
| Adhesive Strength (kg) | 107 | 90 | 63 | 38 | 25 | 16 |
| Tensile strength (kg/5 cm w.) | 92 | 90 | 77 | 70 | 63 | 54 |
| Elongation (%) | 80 | 72 | 65 | 55 | 50 | 40 |

According to the present invention, in the case that a laminate material containing an additive is formed into uniaxially oriented laminate and further a woven or non-woven fabric is prepared from the uniaxially oriented laminate, the troubles owing to the exudation of additive can be avoided without difficulty throughout the production process by scarcely changing the ordinary production system.

What is claimed is:

1. A laminate material which comprises an inner layer composed of an orientable resin A containing a light stabilizing effective amount of a light stabilizer and coating layers composed of a resin B, said resin B being a thermoplastic resin containing no additive and having a melting point lower than that of resin A, said coating layers applied onto both surfaces of said inner layer to prevent exudation of said light stabilizer.

2. The laminate material as claimed in claim 1 wherein said laminate material has a triple-layer structure made by co-extrusion, said triple layer structure composed of a layer of said orientable resin A containing said light stabilizer and layers of resin B containing no additive disposed on both surfaces of said layer of orientable resin A containing said light stabilizer.

3. The laminate material as claimed in claim 1 wherein said laminate material has a triple-layer structure made by preparing two laminate films, each of said laminate films composed of a layer of said orientable resin A containing said light stabilizer and a layer of said resin B containing no additive and then rolling said laminate films with said layers of said resin A in face-to-face relationship to make them form an integral inner layer.

4. A split web (a) or slit web (b) uniaxially oriented laminate comprising an oriented laminate material composed of an inner layer of an orientable resin A containing a light stabilizing effective amount of a light stabilizer and layers of a resin B containing no additive disposed on both surfaces of said inner layer to prevent said light stabilizer from exuding from said inner layer and thereafter oriented and formed into a split web (a) or a slit web (b).

5. The uniaxially oriented laminate as claimed in claim 4 wherein said thickness of said layers of resin B, after orientation, are at least 1 μm.

6. The uniaxially oriented laminate as claimed in claim 5 wherein said thickness of said layers of resin B, after orientation, are at least 4 μm.

7. The uniaxially oriented laminate as claimed in claim 4 wherein said split web (a) is made by the steps of stretching said laminate material and then forming therein a plurality of intermittent splits in the direction of said stretching.

8. The uniaxially oriented laminate as claimed in claim 4 wherein said split web (a) is formed by the steps of uniaxially stretching said laminate material in the longitudinal direction at a total stretching ratio in the range of 5 to 15 and longitudinal splitting in a cross-stitch pattern.

9. The uniaxially oriented laminate as claimed in claim 4 wherein said slit web (b) is formed by the steps of forming a plurality of intermittent slits in said laminate material and then stretching said laminate material in the direction of said slits.

10. The uniaxially oriented laminate as claimed in claim 4 wherein said slit web (b) is made by the steps of forming said laminate material; preliminary longitudinal stretching of said laminate material at a stretching ratio in the range of 1.1 to 3; transverse slitting in a cross-stitch pattern; and transverse stretching at a total stretching ratio in the range of 1.1 to 15.

11. A laminate material which comprises an inner layer composed of an orientable resin A containing a light stabilizer present in a concentration of 300 to 10,000 ppm and coating layers composed of a resin B, said resin B being a thermoplastic resin containing no additive and having a melting point lower than resin A, said coating layers applied onto both surfaces of said inner layer to prevent exudation of said light stabilizer.

* * * * *